United States Patent
Jeon et al.

(10) Patent No.: US 9,742,336 B2
(45) Date of Patent: Aug. 22, 2017

(54) AIR CONDITIONER WITH VARIABLE POWER CONVERTER

(71) Applicant: LG Electronics Inc., Seoul (KR)

(72) Inventors: Jonghyun Jeon, Seoul (KR); Taeyoung Park, Seoul (KR); Jungsong Moon, Seoul (KR); Sangyoung Kim, Seoul (KR); Joonsik An, Seoul (KR)

(73) Assignee: LG Electronics Inc., Seoul (KR)

( * ) Notice: Subject to any disclaimer, the term of this patent is extended or adjusted under 35 U.S.C. 154(b) by 177 days.

(21) Appl. No.: 14/205,614

(22) Filed: Mar. 12, 2014

(65) Prior Publication Data

US 2014/0271272 A1 Sep. 18, 2014

(30) Foreign Application Priority Data

Mar. 13, 2013 (KR) .................. 10-2013-0026865
Mar. 13, 2013 (KR) .................. 10-2013-0026866

(51) Int. Cl.
*H02M 5/42* (2006.01)
*H02P 27/06* (2006.01)
(Continued)

(52) U.S. Cl.
CPC .............. *H02P 27/06* (2013.01); *H02M 7/06* (2013.01); *H02M 7/1552* (2013.01); *F24F 11/02* (2013.01)

(58) Field of Classification Search
CPC ......... H02M 2003/1586; H02M 3/157; H02M 3/1584; H02M 3/1582; H02M 7/08;
(Continued)

(56) References Cited

U.S. PATENT DOCUMENTS 6,396,229 B1 * 5/2002 Sakamoto ................ H02P 6/18
 318/400.02
8,072,193 B2 * 12/2011 Yang .................... H02M 3/1584
 323/213
(Continued)

FOREIGN PATENT DOCUMENTS

KR 2010003580 A 1/2010
KR 2010102965 A 9/2010

OTHER PUBLICATIONS

European Search Report dated Jul. 27, 2015 from corresponding European Patent Application No. 14159054.7, 9 pages.

*Primary Examiner* — Bickey Dhakal
(74) *Attorney, Agent, or Firm* — Fish & Richardson P.C.

(57) ABSTRACT

A power converter and an air conditioner having the same, in which the power converter includes a rectifying unit configured to rectify an input AC current and an interleave converter that has a plurality of converters and that is configured to convert rectified output from the rectifying unit to DC power and output the converted DC power. The power converter also includes a capacitor connected to an output terminal of the interleave converter, and a converter controller configured to control the interleave converter. The converter controller controls the interleave converter by calculating a load level of both terminals of the capacitor and changing a number of operating converters in the plurality of converters of the interleave converter based on the determined load level of both terminals of the capacitor.

17 Claims, 13 Drawing Sheets

(51) Int. Cl.
*H02M 7/155* (2006.01)
*H02M 7/06* (2006.01)
*F24F 11/02* (2006.01)

(58) Field of Classification Search
CPC .......... H02M 7/153; H02M 7/17; H02M 7/23; H02P 2201/09; H02P 2201/11
USPC .......................................................... 363/89
See application file for complete search history.

(56) References Cited

U.S. PATENT DOCUMENTS

| 8,817,506 | B2* | 8/2014 | Shimomugi | ........ | H02M 3/1584 |
| | | | | | 323/272 |
| 2002/0189301 | A1* | 12/2002 | Hosoito | ................ | D06F 37/203 |
| | | | | | 68/12.02 |
| 2010/0226149 | A1* | 9/2010 | Masumoto | .......... | H02M 1/4225 |
| | | | | | 363/20 |
| 2010/0253274 | A1* | 10/2010 | Clothier | .................. | H02P 6/008 |
| | | | | | 318/561 |

* cited by examiner

S₁ on

S₁ off

S· on

S· off

AIR CONDITIONER WITH VARIABLE POWER CONVERTER

CROSS-REFERENCE TO RELATED APPLICATIONS

This application claims the priority benefit of Korean Patent Application Nos. 10-2013-0026865 and 10-2013-0026866, filed on Mar. 13, 2013, in the Korean Intellectual Property Office, the disclosures of which are incorporated herein by reference.

FIELD

The present disclosure relates to a power converter and an air conditioner having the same. For example, the present disclosure relates to a power converter which is operable at different loads efficiently, and an air conditioner having the same.

BACKGROUND

An air conditioner is machine installed in a space, such as a room, a living room, an office, or a store, for controlling a temperature, humidity, cleanness, and an air flow of the space in a manner that maintains a comfortable room environment.

In general, air conditioners include unit type air conditioners and split type air conditioners. Though functionally the same, the unit type air conditioner has a cooling function and a heat dissipation function integrated therein to install in a recess in a wall or in a window of a house, and the split type air conditioner has an indoor unit installed in a room for cooling or heating the room, and an outdoor unit installed outdoors for heat dissipation and compression, where the indoor unit and the outdoor unit are connected with refrigerant pipelines.

SUMMARY

In one aspect, a power converter includes a rectifying unit configured to rectify an input AC current and an interleave converter that has a plurality of converters and that is configured to convert rectified output from the rectifying unit to DC power and output the converted DC power. The power converter also includes a capacitor connected to an output terminal of the interleave converter and a converter controller configured to control the interleave converter by calculating a load level of both terminals of the capacitor and changing a number of operating converters in the plurality of converters of the interleave converter based on the calculated load level of both terminals of the capacitor.

Implementations may include one or more of the following features. For example, the plurality of converters of the interleave converter may include a first converter and a second converter and the converter controller may be configured to operate only the first converter based on a calculation that the load level of both terminals of the capacitor is lower than a first level and operate the first converter and the second converter based on a calculation that the load level of both terminals of the capacitor is higher than the first level. In this example, the converter controller may be configured to control operation of a first switching element of the first converter based on a calculation that the load level of both terminals of the capacitor is lower than the first level and control operation of the first switching element of the first converter and a second switching element of the second converter based on a calculation that the load level of both terminals of the capacitor is higher than the first level. Further, the converter controller may be configured to control the first and second switching elements of the first and second converters to perform interleaved operation based on a calculation that the load level of both terminals of the capacitor is higher than the first level.

In some implementations, the first converter in the interleave converter may include a first inductor connected to the rectifying unit, a first diode connected to an output terminal of the interleave converter, and a first switching element connected in parallel between the first inductor and the first diode. In these implementations, the second converter in the interleave converter may include a second inductor connected to the rectifying unit, a second diode connected to an output terminal of the interleave converter, and a second switching element connected in parallel between the second inductor and the second diode. Further, the first converter in the interleave converter may include a first switching element of a first type and the second converter in the interleave converter may include a second switching element of a second type having a rated voltage higher than the first type.

In addition, the power converter may include an inverter that is connected between the capacitor and a motor and that is configured to convert the converted DC power output from the interleave converter to an AC power and output the AC power. Also, the power converter may include a voltage detector configured to detect a voltage at both terminals of the capacitor and the converter controller may be configured to control operation of the interleave converter based on the detected voltage at both terminals of the capacitor.

In some examples, the power converter may include a voltage detector configured to detect a voltage at both terminals of the capacitor. In these examples, the converter controller may be configured to calculate a load connected to the power converter based on at least one of current flowing to the first inductor in the first converter or current flowing to the second inductor in the second converter and the detected voltage at both terminals of the capacitor, and control operation of the interleave converter based on the calculated load.

In another aspect, a power converter includes a rectifying unit configured to rectify an input AC current and an interleave converter that has a plurality of converters and that is configured to convert rectified output from the rectifying unit to DC power and output the converted DC power. The plurality of converters include a first converter that includes a first switching element of a first type and a second converter that includes a second switching element of a second type having a rated voltage higher than the first type. The power converter also includes a converter controller configured to control the interleave converter.

Implementations may include one or more of the following features. For example, the power converter may include a capacitor connected to an output terminal of the interleave converter. In this example, the converter controller may be configured to control operation of the first switching element of the first converter based on a calculation that a load level of both terminals of the capacitor is lower than a first level and control operation of the second switching element of the second converter based on a calculation that the load level of both terminals of the capacitor is higher than a second level which is higher than the first level.

In addition, the converter controller may be configured to control operation of the first and second switching elements of the first and second converters based on a calculation that the load level of both terminals of the capacitor falls between the first level and the second level. And, the converter controller may include a first converter controller configured to control the first converter and a second converter controller configured to control the second converter. Further, the first switching element may include a metal oxide semiconductor field effect transistor and the second switching element may include an insulated gate bipolar mode transistor.

In yet another aspect, an air conditioner includes a compressor and a power converter configured to supply power to a motor in the compressor. The power converter includes a rectifying unit configured to rectify an input AC current and an interleave converter that has a plurality of converters and that is configured to convert rectified output from the rectifying unit to DC power and output the converted DC power. The power converter also includes a capacitor connected to an output terminal of the interleave converter and a converter controller configured to control the interleave converter by calculating a load level of both terminals of the capacitor and changing a number of operating converters in the plurality of converters of the interleave converter based on the calculated load level of both terminals of the capacitor.

Implementations may include one or more of the following features. For example, the plurality of converters of the interleave converter may include a first converter and a second converter and the converter controller may be configured to control operation of a first switching element of the first converter based on a calculation that the load level of both terminals of the capacitor is lower than a first level and control operation of the first switching element of the first converter and the second switching element of the second converter based on a calculation that the load level of both terminals of the capacitor is higher than the first level. Further, the first converter in the interleave converter may include a first switching element of a first type and the second converter in the interleave converter may include a second switching element of a second type having a rated voltage higher than the first type.

In some implementations, the first converter in the interleave converter may include a first inductor connected to the rectifying unit, a first diode connected to an output terminal of the interleave converter, and a first switching element connected in parallel between the first inductor and the first diode. In these implementations, the second converter in the interleave converter may include a second inductor connected to the rectifying unit, a second diode connected to an output terminal of the interleave converter, and a second switching element connected in parallel between the second inductor and the second diode.

In some examples, the air conditioner may include a voltage detector configured to detect a voltage of both terminals of the capacitor. In these examples, the converter controller may be configured to calculate a load connected to the power converter based on at least one of current flowing to the first inductor in the first converter or current flowing to the second inductor in the second converter and the detected voltage at both terminals of the capacitor, and control operation of the interleave converter based on the calculated load.

In another aspect, an air conditioner includes a compressor and a power converter configured to supply power to a motor in the compressor. The power converter includes a rectifying unit configured to rectify an input AC current and an interleave converter that has a plurality of converters and that is configured to convert rectified output from the rectifying unit to DC power and output the converted DC power. The plurality of converters includes a first converter that includes a first switching element of a first type and a second converter that includes a second switching element of a second type having a rated voltage higher than the first type. The power converter also includes a converter controller configured to control the interleave converter.

DETAILED DESCRIPTION

Figure 1:
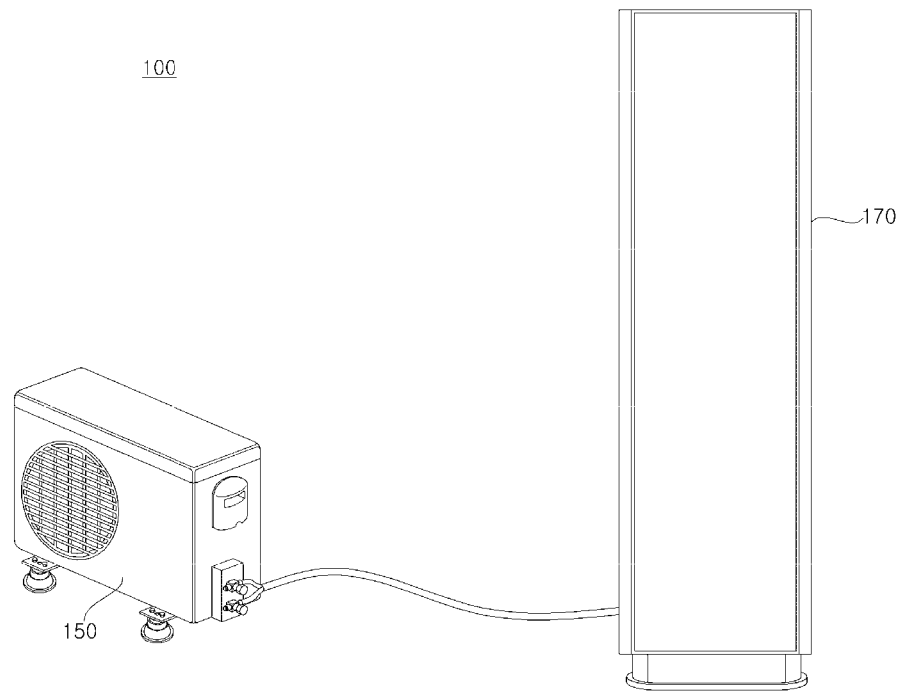
FIG. 1 is a perspective view illustrating a configuration of an example air conditioner.
Figure 2:
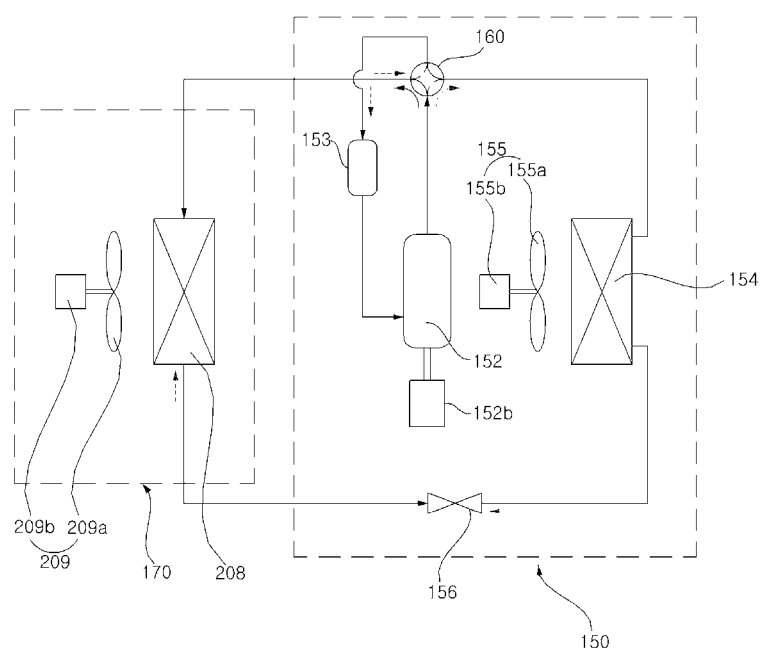
FIG. 2 is a schematic view illustrating the air conditioner in FIG. 1.

FIG. 1 illustrates a configuration of an example air conditioner, and FIG. 2 is a schematic view illustrating the example air conditioner in FIG. 1.

Referring to FIGS. 1 and 2, the air conditioner 100 includes an outdoor unit 150 and an indoor unit 170.

The outdoor unit 150 is operated in a cooling mode or a heating mode and supplies refrigerant to the indoor unit 170 in response to demand from the indoor unit 170 connected thereto or an external control order.

The outdoor unit 150 includes a compressor 152 for compressing refrigerant, a compressor motor 152b for driving the compressor, an outdoor heat exchanger 154 for dissipating heat from compressed refrigerant, an outdoor fan unit 155 having an outdoor fan 155a arranged to one side of the outdoor heat exchanger 154 for accelerating the heat dissipation from the refrigerant and a motor 155b for rotating the outdoor fan 155a, an expansion device 156 for expanding condensed refrigerant, a cooling/heating changeover valve 160 for changing a flow path of the compressed refrigerant, and an accumulator 153 for temporary storage of gas refrigerant for supplying refrigerant at a fixed pressure to the compressor after removal of water and foreign matter from the refrigerant. The compressor 152 may be one of an inverter compressor, and a constant speed compressor.

In addition, the outdoor unit 150 may further include at least one pressure sensor for measuring a pressure of the refrigerant, and at least one temperature sensor for measuring a temperature.

The indoor unit 170 includes an indoor heat exchanger 208 arranged to a room for cooling or heating the room, and an indoor fan unit 209 having an indoor fan 209a arranged to one side of the indoor heat exchanger 208 for accelerating heat dissipation from the refrigerant and a motor 209b for rotating the indoor fan 209a. There may be at least one indoor heat exchanger 208 installed in the room.

The indoor unit 170 may further include an outlet for discharging heat exchanged air, and a wind direction controller for controlling opening/closing of the outlet and a direction of the air being discharged. For example, a vane may be mounted for opening/closing at least one of an air inlet and the air outlet as well as for guiding the air. The vane may open/close the air inlet and the air outlet, and also may guide a direction of the air being drawn in or discharged.

In addition, the indoor unit 170 may control an air flow rate being drawn in or discharged by controlling a rotation speed of the indoor fan 209a.

And, the indoor unit 170 may further include a display unit for displaying an operation state and information set to the indoor unit 170, and an input unit for inputting data to be set. Also, the indoor unit 170 may include an indoor temperature sensing unit for sensing a room temperature, and a human body sensing unit for sensing a human body present to a room space.

Further, the air conditioner 100 may be configured as a room cooler for cooling the room, or as a heat pump for cooling or heating the room.

In addition, although FIG. 1 shows the indoor unit 170 as a stand type as an example, a ceiling type or a wall mounting type also may be used, or a variety of modes, such as a unit type which has no individual outdoor unit or an indoor unit, may be used.

In some implementations, refrigerant pipelines are connected between the indoor unit 170 and the outdoor unit 150, for discharging refrigerated/heated air to the room from the indoor unit 170 depending on circulation of the refrigerant. In these implementations, a single outdoor unit 150 may be connected to a plurality of the indoor units 170, or at least one indoor unit may be connected to each of a plurality of outdoor units.

The indoor unit 170 and the outdoor unit 150 may have communication lines connected therebetween for transmission/reception of a control order according to a predetermined communication system.

Figure 3:
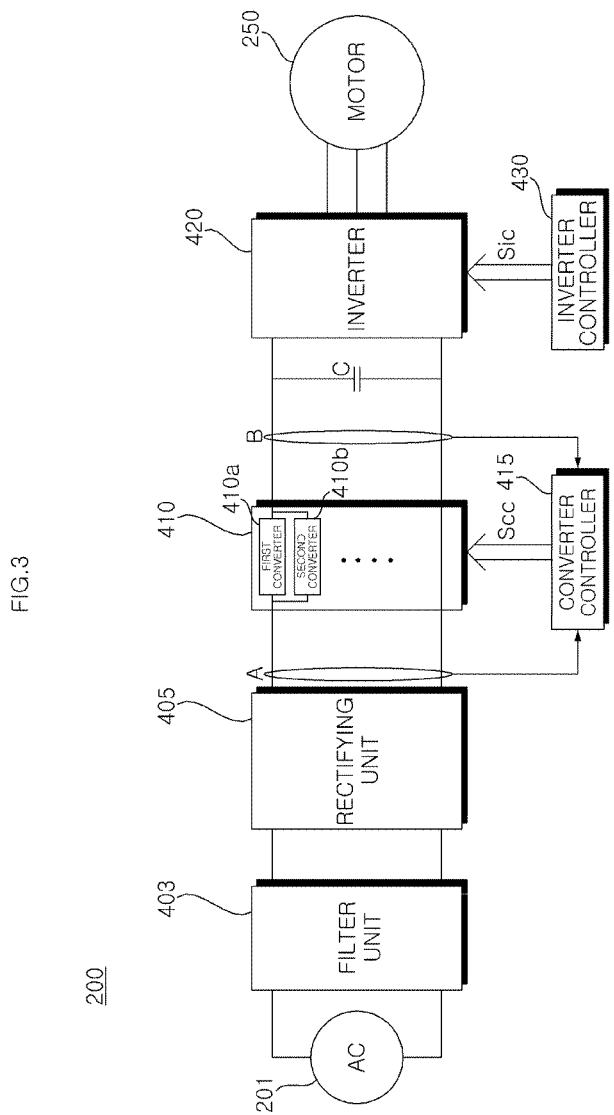
FIG. 3 is a block diagram illustrating an example of the power converter in the outdoor unit in FIG. 1.

Further, the compressor 152 may be driven by drive power supplied thereto through a power converter 200 (see FIG. 3). For instance, the drive power may be supplied to the motor in the compressor 152 from the power converter 200.

Figure 4:
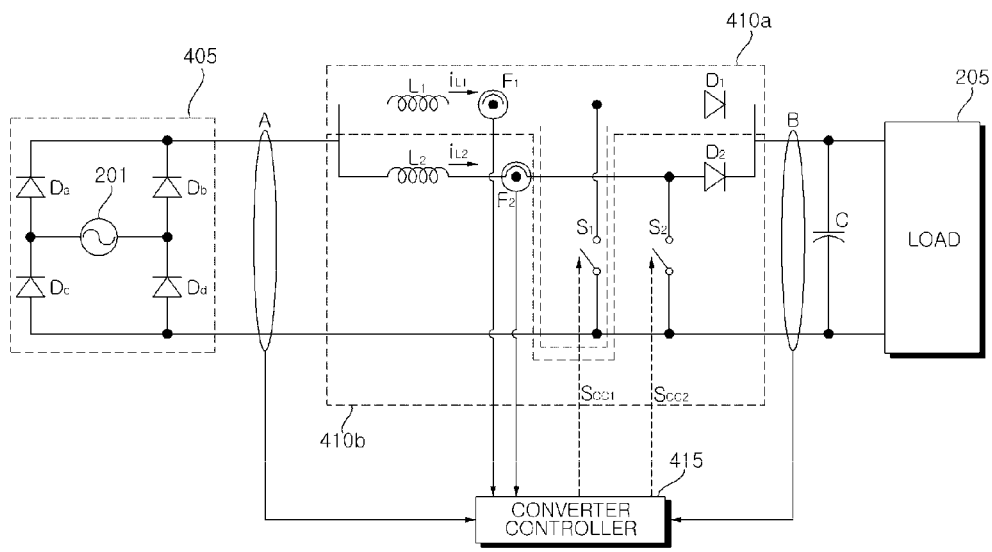
FIG. 4 is a circuit diagram illustrating an example of the converter in the power converter in FIG. 3.

FIG. 3 illustrates an example of the power converter in the outdoor unit in FIG. 1, and FIG. 4 illustrates an example of the converter in the power converter in FIG. 3.

The power converter 200 may include a filter unit 403, a rectifying unit 405, a converter 410, a converter controller 415, a capacitor C, an inverter 420, and an inverter controller 430.

The filter unit 403 may be arranged between an input AC power source 201 and the rectifying unit 405, for filtering out a harmonic current from the input AC power source 201 or the power converter 200. The filter unit 403 may have an inductor which is an inductive device, and a capacitor which is a capacitive device. For example, the filter unit 403 may be an LCL filter with a first inductor, a capacitor, and a second inductor arranged to filter out a harmonic current from the input AC power source 201.

The rectifying unit 405 receives the input AC power 201 from the filter unit 403 and rectifies the same. Although FIG. 4 illustrates the rectifying unit 405 for single phase AC power, having four diodes Da, Db, Dc, and Dd used in a bridge mode, a variety of other types of rectifiers may be used.

The converter 410 converts the power rectified at the rectifying unit 405 to DC power and outputs the same. Particularly, the converter 410 outputs the DC power to a capacitor C arranged at output terminals of the converter 410.

In some examples, the converter 410 may be an interleave converter (Cascade converter) having a plurality of converters 410a, 410b. Although an interleave boost converter, an interleave buck boost converter, an interleave buck converter and so on may be used as the interleave converter, the specification is focused on the interleave boost converter, as an example.

The plurality of boost converters 410a, 410b, in the interleave boost converter 410, are connected in parallel, for performing interleaved operation. As the plurality of boost converters connected in parallel to one another perform interleaved voltage control, voltage control by current distribution is possible. Accordingly, an endurance of a circuit device in the interleave boost converter 410 may be improved, and ripple of an input current may be reduced.

For example, if a first boost converter 410a and a second boost converter 410b are connected in parallel to each other in the interleave boost converter 410 and perform interleaved operation, since a first switching element S1 in the first boost converter 410a and a second switching element S2 in the second boost converter 410b are turned on/off with a 180 degree phase difference from each other electrically, a switching loss takes place. The switching loss results in efficiency at a low load region lower than efficiency at a high load region.

In order to address the switching loss, a number of operating interleaved converters may be changed according to a load level of both terminals of the capacitor which are output terminals of the interleaved converters for increasing operation efficiency of entire region.

For example, the interleave converter 410 is controlled such that the first boost converter 410a is operated at the low load region, and the first boost converter 410a and the second boost converter 410b are operated at the high load region. The interleave convertor 410 of such a configuration is illustrated in FIG. 4.

In addition, as the switching element used in the interleave boost converter, a MOSFET (metal oxide semiconductor field effect transistor), an IGBT (insulated gate bipolar mode transistor), and other types of transistors may be used.

Further, although all of the boost converters 410a, 410b in the interleave converter 410 may have the same type of switching elements, for example, the MOSFET or IGBT, other types of switching elements also may be used. For instance, the MOSFET device may be used for the first boost converter 410a, and the IGBT device may be used for the second boost converter 410b. If the MOSFET device is used for the first boost converter which is operated at the low load region, fast switching is possible enabling improvement in operation efficiency, and, if the IGBT device is used for the second boost converter 410*b* which is operated at the high load region, the interleave converter 410 may perform stable operation.

Of the plurality of boost converters 410, FIG. 4 illustrates a first boost converter 410*a* and a second boost converter 410*b*. The boost converter 410 is described as having the first boost converter 410*a* and the second boost converter 410*b*, although other arrangements are possible.

The first boost converter 410*a* may include a first diode D1 having one terminal connected to the capacitor C, a first inductor L1 connected between the first diode D1 and the rectifying unit 405, and a first boost switching element S1 connected to the first inductor L1 and the first diode D1 in parallel.

The second boost converter 410*b* may include a second diode D2 having one terminal connected to the capacitor C, a second inductor L2 connected between the second diode D2 and the rectifying unit 405, and a second boost switching element S2 connected to the second inductor L2 and the second diode D2 in parallel.

If the first boost converter 410*a* and the second boost converter 410*b* are connected to each other in parallel and perform interleaved operation, controlling the first switching element S1 in the first boost converter 410*a* and the second switching element S2 in the second boost converter 410*b* to be turned on/off with a 180 degree phase difference electrically may result in a switching loss. The switching loss results in efficiency at the low load region lower than efficiency at the high load region.

In order to address the switching loss, a number of operating converters in the interleave converter may be changed according to a load level on both terminals of the capacitor which are output terminals of the interleave converter 410, thereby improving operation efficiency for entire load regions.

For instance, the interleave converter 410 is controlled such that the first boost converter 410*a* is operated in the low load region, and the first boost converter 410*a* and the second boost converter 410*b* are operated in the high load region.

To control operation of the first boost converter 410*a* and the second boost converter 410*b*, the converter controller 415 divides a load region into a low load region Ae1 (See FIG. 6A) and a high load region Ae2 (See FIG. 6A) according to a load of a voltage at both terminals of the capacitor C. The converter controller 415 controls the interleave converter 410 such that only the first boost switching element S1 in the first converter 410*a* is operated in the low load region, and the first boost switching element S1 and the second boost switching element S2 are operated alternately such that the first converter 410*a* and the second converter 410*b* perform interleaved operation in the high load region.

In addition, the first converter 410*a* and the second converter 410*b* are connected in parallel to each other and operable in boost modes. The boost mode operation will be described in more detail later, with reference to FIGS. 8A and 8B.

Further, the first boost switching element S1 in the first boost converter 410*a* and the second boost switching element S2 in the second boost converter 410*b* may be identical switching elements, for example, the MOSFET or the IGBT.

On the other hand, the first boost switching element S1 in the first boost converter 410*a* and the second boost switching element S2 in the second boost converter 410*b* also may include switching elements that are different from each other.

For example, if only the first boost switching element S1 in the first boost converter 410*a* is operated in the low load region, the first boost switching element S1 may be the MOSFET for performing high efficiency power conversion, and the second boost switching element S2 which is operated in the high load region may be the IGBT.

And, the power converter 200 may further include an input voltage detector A for detecting an output terminal voltage of the rectifying unit 405, an output voltage detector B for detecting an output terminal voltage of the interleave boost converter 410, i.e., a voltage of a DC terminal capacitor C, and a current detector F1 and F2 for detecting current flowing to the inductor L1 and L2 in the interleave boost converter 410.

The input voltage detector A may detect an output terminal voltage of the rectifying unit 405. The input voltage detector A may include a resistor device, an amplifier, and so on. An input voltage Vc1 to be detected may be a pulse mode discrete signal, and may be inputted to the convertor controller 415.

The output voltage detector B, i.e., the DC terminal voltage detector B, may detect an output terminal voltage of the interleave boost converter 410, particularly, an opposite terminal voltage Vdc of the capacitor C.

The capacitor C is arranged between the inverter 420 and the load 205 for storing an output DC power of the interleave converter thereto. Although the drawing illustrates one device as the smoothing capacitor C, a plurality of devices may be provided for securing device stability. In addition, since a DC current is stored in the capacitor C, both terminals of the capacitor C may be named as DC terminals or DC link terminals.

If the load is defined to include the inverter 420 and the motor 250, it may be shown that the load 205 is connected to the both terminals of the capacitor C in the power converter as shown in the drawing. Accordingly, the DC terminal voltage Vdc may be the same as a load 205 voltage. The output voltage Vdc to be detected may be a pulse mode discrete signal, and may be inputted to the converter controller 415.

The first current detector F1 may detect a current $i_{L1}$ flowing to the first inductor L1 in the first boost converter 410*a*, and the second current detector F2 may detect a current $i_{L2}$ flowing to the second inductor L2 in the second boost converter 410*b*. CTS (Current Transformers), shunt resistors and the like may be used as the first and second current detectors F1 and F2. The input AC current $i_{L1}$, and $i_{L2}$ to be detected may be pulse mode discrete signals, and may be inputted to the converter controller 415.

In addition, the converter controller 415 may include a first converter controller for controlling the first boost converter 410*a*, and a second converter controller for controlling the second boost converter 410*b*.

The converter controller 415 may calculate the load on both terminals of the capacitor based on at least one of the first and second input currents $i_{L1}$ and $i_{L2}$ detected by the first and second current detectors F1 and F2 and the DC terminal voltage Vdc detected by the DC terminal voltage detector B. And, if the calculated load falls under the low load region, the converter controller 415 may control turn on/turn off timing of the first boost switching element S1 in the first boost converter 410*a*.

In addition, if the calculated load falls under the high load region, the converter controller 415 may control operation of both the first and second boost converters 410*a* and 410*b*. That is, the converter controller 415 may control a turn on/turn off timing of the first boost switching element S1 in the first boost converter 410a, and a turn on/turn off timing of the second boost switching element S2 in the second boost converter 410b. In this case, the first boost converter 410a and the second boost converter 410b may perform interleaved operation.

The inverter 420 has a plurality of inverter switching elements for converting the DC current Vdc smoothed by the turn on/turn off operation of the switching element into a three phase power va, vb, and vc of a predetermined frequency and outputting the same to a three phase synchronous motor 250. In this case, the motor 250 may be a motor in the compressor.

The inverter controller 430 outputs an inverter switching control signal Sic to the inverter 420 for controlling switching operation of the inverter 420. The inverter switching control signal Sic may be a PWM switching control signal, and may be generated and output based on an output current value $i_O$ detected by the output current detector (E in FIG. 9).

Figure 5:
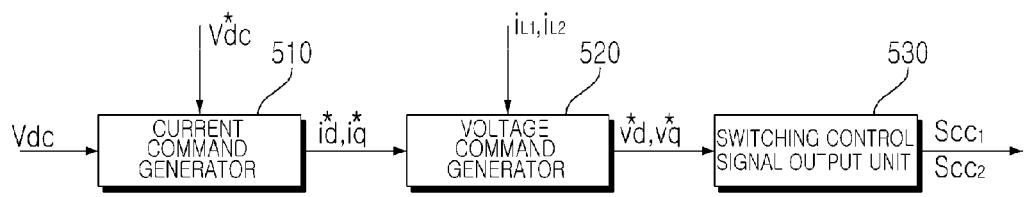
FIG. 5 is a block diagram illustrating an example of the converter controller in FIG. 4.

FIG. 5 illustrates an example of the converter controller 415 in FIG. 4.

Referring to FIG. 5, the converter controller 415 may include a current command generator 510, a voltage command generator 520, and a switching control signal output unit 530.

The current command generator 510 may generate d-axis and q-axis current command values i*d, i*q with a PI controller or the like based on the DC terminal voltage Vdc detected by the output voltage detector B, i.e., the DC terminal voltage detector B and a DC terminal voltage command value V*dc.

The voltage command generator 520 generates d-axis and q-axis voltage command values $v^*_d$, $v^*_q$ with the PI controller or the like based on the d-axis and q-axis current command values i*d, i*q and the detected first and second input currents $i_{L1}$, $i_{L2}$.

The switching control signal output unit 530 outputs a first converter switching control signal Scc1 and a second converter switching control signal Scc2 to the first boost converter 410a and the second boost converter 410b, respectively, for driving the first boost switching element S1 in the first boost converter 410a and the second boost switching element S2 in the second boost converter 410b based on the d-axis and q-axis voltage command values $v^*_d$, $v^*_q$.

The converter controller 415 calculates the load based on the DC terminal voltage Vdc detected by the DC terminal voltage detector B and the first input current $i_{L1}$ and the second input current $i_{L2}$ detected by the first current detector F1 and the second current detector F2, and outputs the first converter switching control signal Scc1 to the first boost converter 410a for driving the first switching element S1 if the calculated load falls in the low load region.

If the calculated load falls in the high load region, the converter controller 415 outputs the first converter switching control signal Scc1 and the second converter switching control signal Scc2 to the first boost converter 410a and the second boost converter 410b, respectively, for interleaved driving of the first switching element S1 and the second switching element S2.

Figure 6A:
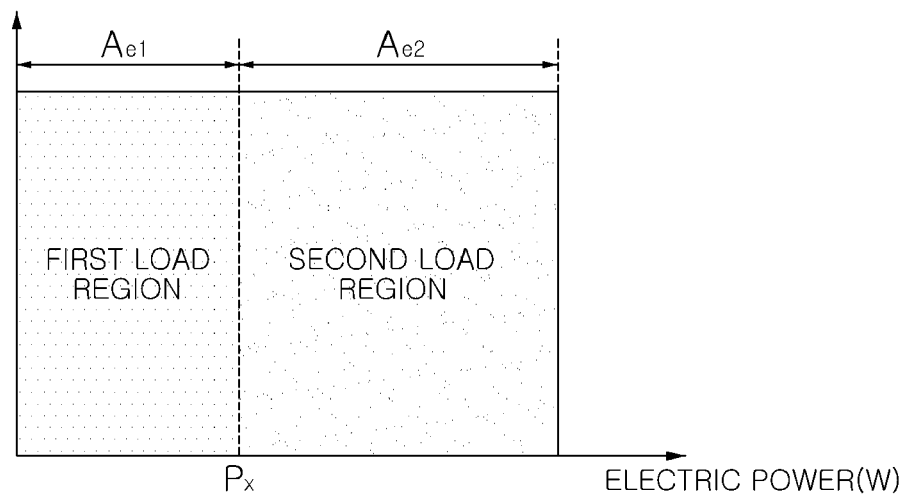
FIG. 6A is a graph illustrating example load regions of a power converter.

FIG. 6A illustrates example load regions of a power converter.

The converter controller 415 may calculate the load on both terminals of the capacitor based on at least one of the first and second input currents $i_{L1}$ and $i_{L2}$ detected by the first and second current detectors F1 and F2 and the DC terminal voltage Vdc detected by the DC terminal voltage detector B. In this case, the load may be electric power.

The converter controller 415 may calculate that the load is a low load if the calculated load is lower than a first electric power level Px, and the load is a high load if the calculated load is higher than the first electric power level Px. Or, the converter controller 415 may calculate that the load is a low load if the calculated load is lower than the first electric power level Px, and the load is a high load if the calculated load is higher than a second electric power level which is higher than the first electric power level Px.

As shown in FIG. 6A, the load 205 may be divided into a low load region Ae1, and a high load region Ae2. In this case, the first electric power level Px may be stored in a memory in the power converter 200.

In some implementations, the first electric power level Px is variable with an operation condition, and the like. In these implementations, if a highest load used for a predetermined time period is below a predetermined value, the first electric power level Px may be lowered.

Figure 6B:
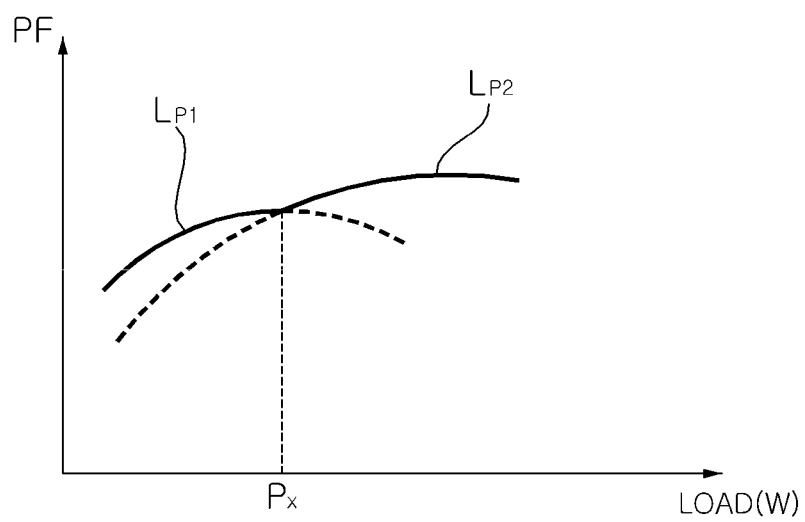
FIG. 6B is a graph illustrating example power vs. power factor of respective regions in FIG. 6A.

FIG. 6B illustrates example power vs. power factor of respective regions in FIG. 6A.

Referring to FIG. 6B, a load lower than the first electric power level Px may fall in the low load region Ae1, and a load higher than the first electric power level Px may fall in the high load region Ae2.

If only the first boost converter 410a is in operation, load vs. operation efficiency (Power factor) may be illustrated as an LP1 curve, and, if both of the first and second boost converters 410a and 410b are in operation, the load vs. operation efficiency may be illustrated as an LP2 curve.

Referring to the LP1 curve and the LP2 curve, FIG. 6B illustrates that, if both of the first and second boost converters 410a and 410b are in operation, the operation efficiency is low due to a switching loss in the low load region, and, if only the first boost converter 410a is in operation, the operation efficiency is low in the high load region.

In some examples, the interleave boost converter is controlled such that only the first boost converter 410a is operated in the low load region with reference to the first electric power level Px, and both the first and second boost converters 410a and 410b are operated in the high load region with reference to the first electric power level Px.

Eventually, as shown with a thick solid line in FIG. 6B, the operation efficiency of the rectifier 200 may be improved in comparison to the load. For instance, the operation efficiency may be improved for a whole load region.

Figure 7A:
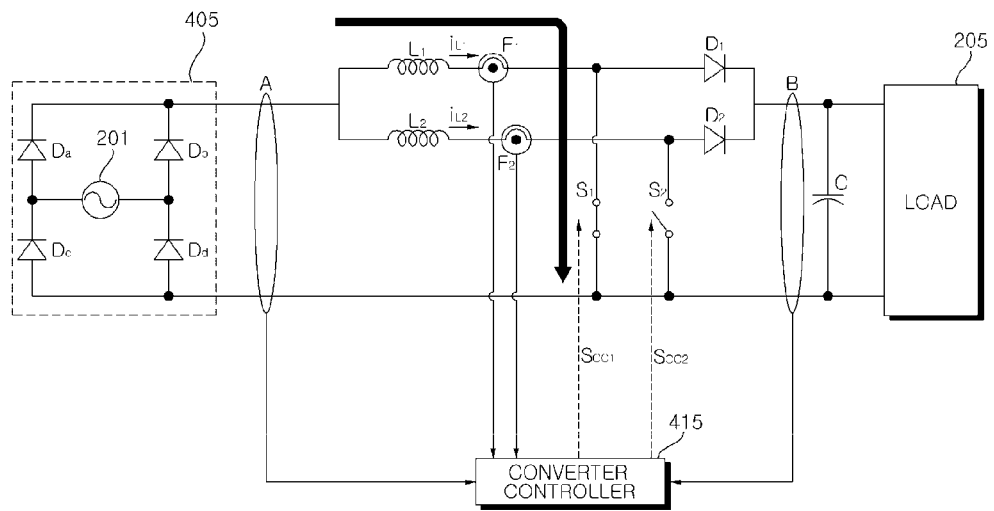
FIGS. 7A and 7B are circuit diagrams illustrating example operation of the power converter in FIG. 4.
Figure 7B:
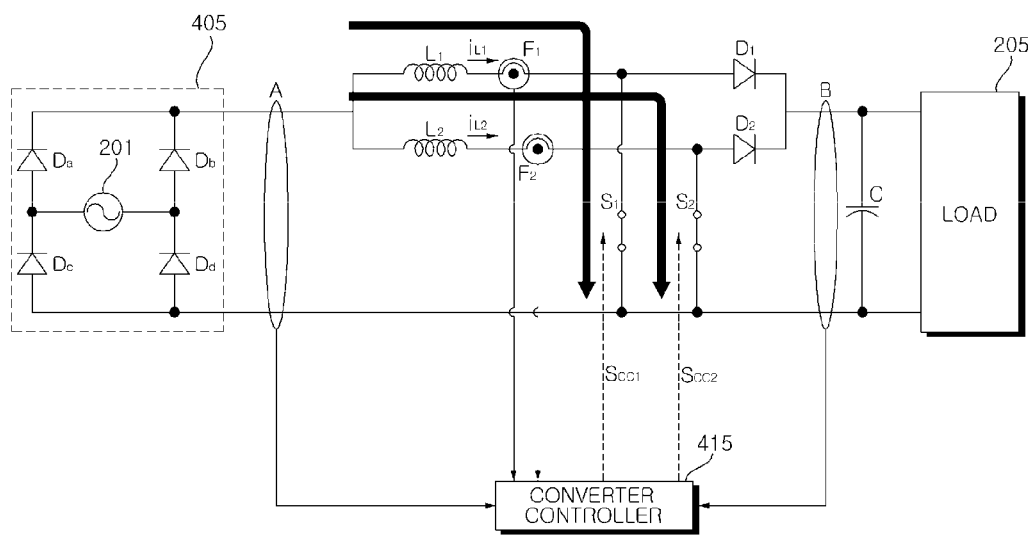

FIGS. 7A and 7B illustrate example operation of the power converter in FIG. 4.

FIG. 7A illustrates example operation of only the first boost converter 410a in the low load region.

If the calculated load is lower than the first electric power level Px, the converter controller 415 calculates that the load is in the low load region and the converter controller 415 controls only the first boost converter 410a to operate.

The first boost switching element S1 in the first boost converter 410a is turned on by the first converter switching control signal Scc1 from the converter controller 415. Accordingly, a current is accumulated at the first inductor for outputting energy accumulated in the first inductor to the capacitor C when the first boost switching element S1 is turned off.

Thus, when the load is low, by operating only the first boost switching element S1 without operating the second boost switching element S2 in the second boost converter 410b, a switching loss may be reduced. In addition, by operating only the first boost switching element S1, the operation efficiency may be improved because an output DC voltage may be further lowered.

Next, FIG. 7B illustrates example operation of the first boost converter 410a and the second boost converter 410b in the high load region.

The converter controller 415 calculates that the load is in the high load region if the calculated load is higher than the first electric power level Px, and the converter controller 415 controls the first boost converter 410a and the second boost converter 410b to perform interleaved operation.

The first boost switching element S1 in the first boost converter 410a is turned on by the first converter switching control signal Scc1 from the converter controller 415. In this case, the second boost switching element S2 in the second boost converter 410b may be turned off.

Then, when the first boost switching element S1 is turned off, the second boost switching element S2 in the second boost converter 410b is turned on by the second converter switching control signal Scc2 from the converter controller 415.

Thus, by controlling the first boost converter 410a and the second boost converter 410b to perform interleaved operation when the load is high, the input current ripple and noise may be reduced. Further, the operation efficiency may be improved even in the high load region.

By changing a number of the operating converters for respective loads of the interleave converter, effective operation of the power converter may be made possible for a variety of loads. Particularly, the compressor or the like having a large variation in load may be operated efficiently.

Figure 8A:
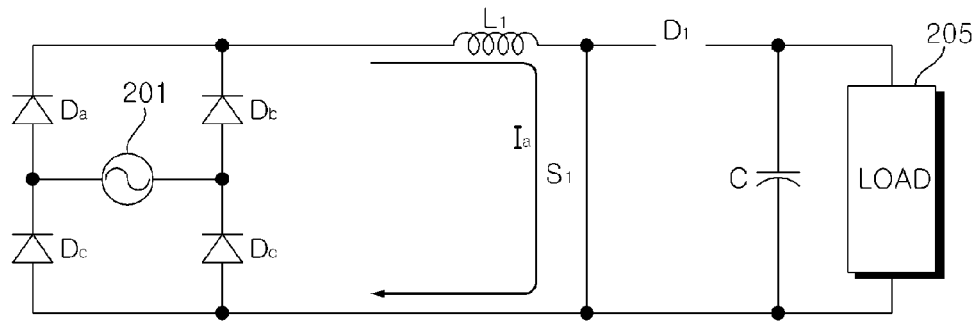
FIGS. 8A and 8B are circuit diagrams for describing example operation of the first converter in FIG. 4.
Figure 8B:
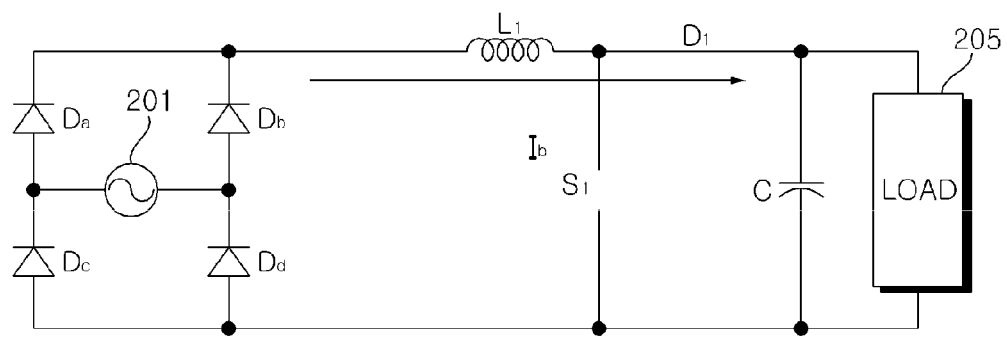

FIGS. 8A and 8B describe example operation of the first converter in FIG. 4.

FIGS. 8A and 8B illustrate an example of the first boost converter 410a operated in a boost mode.

FIG. 8A illustrates a current Ia flowing to a closed loop that includes the first inductor L1 and the first boost switching element S1 if the first boost switching element S1 in the first boost converter 410a is turned on. Energy is accumulated at the first inductor L1 based on the current Ia. In this case, the first diode D1 is not conductive.

FIG. 8B illustrates the first diode D1 becoming conductive if the first boost switching element S1 in the first boost converter 410a is turned off to cause a current Ib to flow through the first inductor L1 and the first diode D1. The current Ib may be a sum of the energy accumulated at the first inductor L1 in FIG. 8A and the current based on the input AC power source 201.

That is, the first boost switching element S1 in the first boost converter 410a is turned on/off, i.e., pulse width modulated.

Since operation of the second converter is identical to the operation illustrated in FIGS. 8A and 8B, detailed description will be referenced, rather than repeated.

Figure 9:
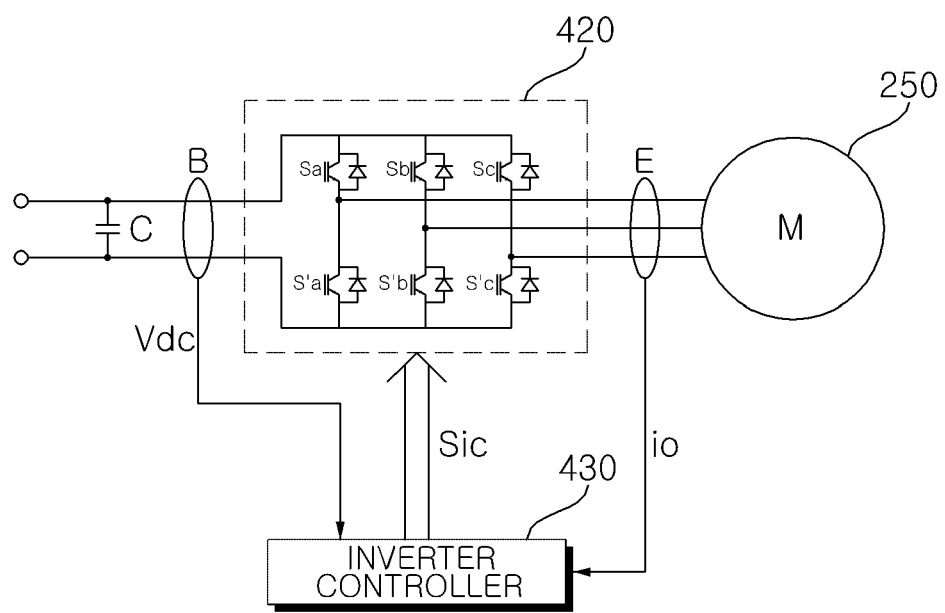
FIG. 9 illustrates an example inverter circuit in the power converter in FIG. 3.

FIG. 9 illustrates an example inverter circuit in the power converter in FIG. 3.

The inverter 420 has upper switching elements Sa, Sb, Sc connected in series and lower switching elements S'a, S'b, S'c connected in series. With this structure, the inverter 420 has a total of three pairs of upper and lower switching elements Sa and S'a, Sb and S'b, and Sc and S'c connected in parallel to each other. Each of the switching elements Sa, S'a, Sb, S'b, Sc. S'c has a diode connected thereto in an antiparallel configuration.

The switching elements in the inverter 420 are turned on/off in response to a switching control signal Sic from the controller 430.

In a motor 250 drive mode, the inverter 420 converts the DC current to both terminals of the capacitor C into an AC current for driving the motor 250.

The inverter controller 430 may control operation of the switching element in the inverter 420. For this, the inverter controller 430 may receive the output current $i_O$ from the output current detector (E in FIG. 9).

The inverter controller 430 outputs the inverter switching control signal Sic to the inverter 420 for controlling switching operation of the inverter 420. The inverter switching control signal Sic may be a PWM switching control signal, and may be generated and output based on the output current value $i_O$ from the output current detector (E in FIG. 9).

The output current detector (E in FIG. 9) may detect the output current $i_O$ flowing between the inverter 420 and the three phase motor 250, i.e., a current flowing to the motor 250. The output current detector E may detect entire output currents ia, ib, ic of respective phases, or the output currents of two phases by using three phase equilibrium.

The output current detector E may be positioned between the inverter 420 and the motor 250, and a CT (Current Transformer) or a shunt resistor may be used for detection of the current.

If the shunt resistor is used, three shunt resistors may be positioned between the inverter 420 and the synchronous motor 250, or may have one terminal connected to the three lower arm switching elements S'a, S'b, S'c, respectively. Use of two shunt resistors that use the three phase equilibrium also may be possible. If one shunt resistor is used, the shunt resistor may be arranged between the capacitor C and the inverter 420.

The detected output current $i_o$ may be a pulse mode discrete signal, may be applied to the controller 430, and the inverter switching control signal Sic may be generated based on the detected output current $i_o$. Description hereinafter will be made assuming that the detected output current $i_o$ includes three phase output currents ia, ib. ic.

Figure 10:
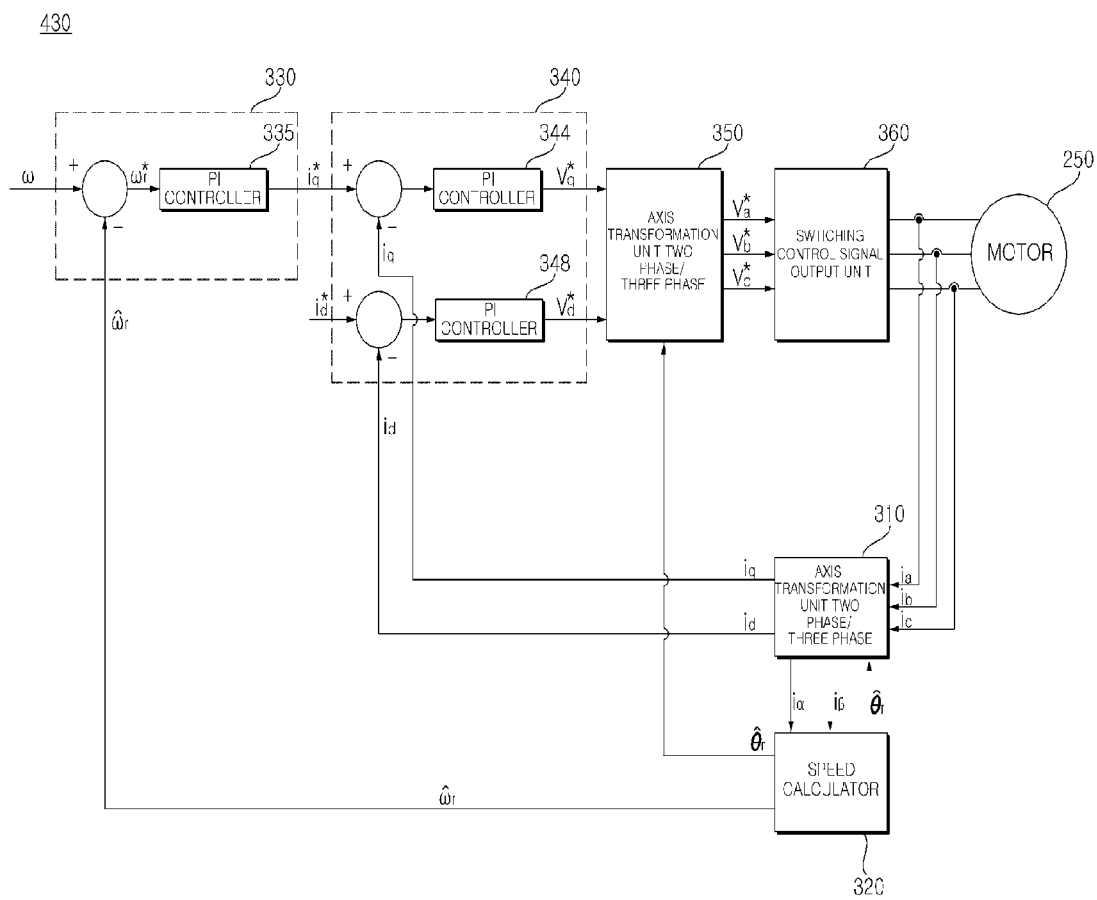
FIG. 10 is a block diagram illustrating an example of the inverter controller in FIG. 9.

FIG. 10 illustrates an example of the inverter controller in FIG. 9.

Referring to FIG. 10, the inverter controller 430 may include a first axis transformation unit 310, a speed calculator 320, a current command generator 330, a voltage command generator 340, a second axis transformation unit 350, and a switching control signal output unit 360.

The axis transformation unit 310 receives the three phase output currents ia, ib, ic from the output current detector E and converts the three phase output currents ia, ib, ic into two phase currents iα, iβ on a stationary frame.

In addition, the axis transformation unit 310 may convert the two phase currents iα, iβ on the stationary frame into two phase currents id, iq on a rotary coordinate system.

The speed calculator 320 may calculate speed $\hat{\omega}_r$ on a position signal of a rotor received from a position sensing unit. That is, the speed may be obtained by dividing the position signal with a time period.

In addition, the position sensing unit may sense a position of the rotor of the motor 250. To sense the position of the rotor of the motor 250, the position sensing unit may include a hall sensor.

Further, the speed calculator 320 may output a calculated position $\hat{\theta}_r$ and a calculated speed $\hat{\omega}_r$ based on the position signal of the rotor applied thereto.

Also, the current command generator 330 calculates a speed command value $\omega^*_r$ based on the calculated speed $\hat{\omega}_r$ and a target speed ω, and generates a current command value $i^*_q$ based on the speed command value $\omega^*_r$. For example, the current command generator 330 performs PI control at a PI controller 335 based on the speed command value $\omega^*_r$ which is a difference between the calculated speed $\hat{\omega}_r$ and a target speed co to generate the current command value $i^*_q$.

Although the drawing illustrates a q-axis current command value $i^*_q$ as the current command value, a d-axis current command value $i^*_d$ also may also be generated. In some examples, a value of the d-axis current command value $i^*_d$ may be set to be zero.

In addition, the current command generator 330 may further include a limiter for limiting a level of the current command value $i^*_q$ so that the current command value $i^*_q$ does not exceed an allowable range.

Next, the voltage command generator 340 generates d-axis and q-axis voltage command values $v^*_d$, $v^*_q$ based on the d-axis and q-axis currents $i_d$, $i_q$ pivoted to the two phase rotary coordinate system at the axis transformation unit 310 and the current command values $i^*_d$, $i^*_q$ from the current command generator 330. For example, the voltage command generator 340 may perform PI control at the PI controller 344 and may generate a q-axis voltage command value $v^*_q$ based on a difference between the q-axis current $i_q$ and the q-axis current command value $i^*_q$. And, the voltage command generator 340 may perform PI control at the PI controller 348, and may generate the d-axis voltage command value $v^*_d$ based on a difference between the d-axis current $i_d$ and the d-axis current command value $i^*_d$. In some examples, a value of the d-axis voltage command value $v^*_d$ may be set to zero matched to a case in which the d-axis current command value $i^*_d$ is set to zero.

In the meantime, the voltage command generator 340 may further include a limiter for limiting a level of the d-axis and q-axis voltage command values $v^*_d$, $v^*_q$ so that the d-axis and q-axis voltage command values $v^*_d$, $v^*_q$ do not exceed allowable ranges, respectively.

The generated d-axis and q-axis voltage command values $v^*_d$, $v^*_q$ are output to the axis transformation unit 350.

The axis transformation unit 350 receives the position $\hat{\theta}_r$ from the speed calculator 320 and the d-axis and q-axis voltage command values $v^*_d$, $v^*_q$ and performs pivoting.

First, the axis transformation unit 350 performs pivoting from the two phase rotary coordinate system to the two phase stationary frame. In this case, the position $\hat{\theta}_r$ calculated at the speed calculator 320 may be used.

Then, the axis transformation unit 350 may perform pivoting from the two phase stationary frame to a three phase stationary frame. With such pivoting, the axis transformation unit 350 outputs three phase output voltage command values v*a, v*b, v*c.

The switching control signal output unit 360 generates and outputs a PWM inverter switching control signal Sic based on the three phase output voltage command values v*a, v*b, v*c.

The inverter switching control signal Sic may be converted into a gate drive signal at a gate drive unit and applied to gates of respective switching elements in the inverter 420. Accordingly, the switching elements Sa, S'a, Sb, S'b, Sc, S'c in the inverter 420 perform switching operation.

In some implementations, the MOSFET is used as the switching element in the first boost converter and the IGBT is used as the switching element in the second boost converter for performing high efficiency power conversion at the low load region and performing stable operation at the high load region. An interleave converter of such a configuration is illustrated in FIG. 11.

Figure 11:
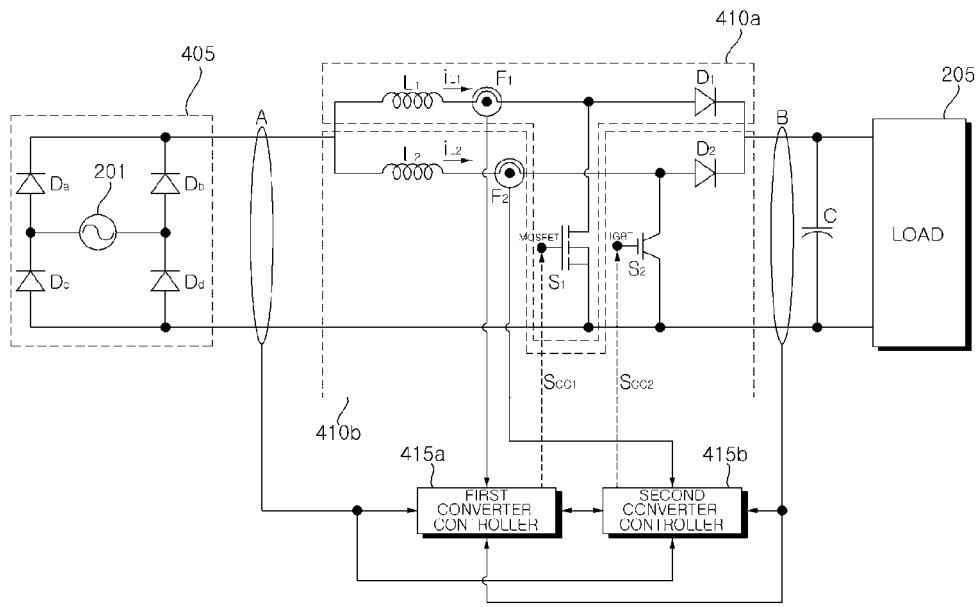
FIG. 11 is a circuit diagram illustrating another example of the converter in the power converter in FIG. 3.

FIG. 11 is illustrates another example of the converter in the power converter in FIG. 3.

Of the plurality of boost converters 410, FIG. 11 illustrates the first boost converter 410a and the second boost converter 410b. Although other arrangements are possible, the boost converter will be described as having the first boost converter 410a and the second boost converter 410b, as an explanatory example.

The first boost converter 410a may include a first diode D1 having one terminal connected to the capacitor C, a first inductor L1 connected between the first diode D1 and the rectifying unit 405, and a first boost switching element S1 connected to the first inductor L1 and the first diode D1 in parallel. In this case, the first boost switching element S1 may be a MOSFET switching element.

In addition, the second boost converter 410b may include a second diode D2 having one terminal connected to the capacitor C, a second inductor L2 connected between the second diode D2 and the rectifying unit 405, and a second boost switching element S2 connected to the second inductor L2 and the second diode D2 in parallel. In this case, the second boost switching element S2 may be an IGBT switching element.

Although the MOSFET switching element has advantages of fast operation speed and good power rectifying efficiency, the MOSFET switching element has a drawback of use at the high load region due to a rated voltage lower than the IGBT switching element.

Although the IGBT switching element has a high rated voltage enabling to perform stable operation at a load region higher than the MOSFET switching element, the IGBT switching element has a drawback in that power rectifying efficiency is poor due to an operation speed lower than the MOSFET switching element.

If the power converter is used in the compressor of the air conditioner which has large variation in load, and if any one of the switching elements is used selectively, it may be difficult to perform operation which satisfies both the low load region and the high load region.

In order to improve operation, both the MOSFET switching element and the IGBT switching element may be used. For instance, the interleave converter may be used for operating respective switching elements depending on the load.

In some examples, the converter controller 415 divides the load of the voltage at both terminals of the capacitor C into a low load region Ae1 (See FIG. 13), a high load region Ae3 (See FIG. 13), and an intermediate load region Ae2 (See FIG. 13), and, according to the load regions, controls operation of only the MOSFET switching element S1 in the first boost converter 410a at the low load region, controls operation of only the IGBT switching element S2 in the second boost converter 410b at the high load region, and controls operation of the MOSFET switching element S1 and the IGBT switching element S2 alternately such that the first boost converter 410a and the second boost converter 410b perform interleaved operation at the intermediate region.

As shown, the first boost converter 410a and the second boost converter 410b are connected to each other in parallel, and operable in a boost mode. The boost mode operation will be described in more detail later with reference to FIGS. 15A and 15B.

And, the power converter 200 may further include an input voltage detector A for detecting an output terminal voltage of the rectifying unit 405, an output voltage detector B for detecting an output terminal voltage of the interleave boost converter 410, i.e., a voltage of a DC terminal capacitor C, and current detectors F1 and F2 for detecting current flowing to the inductors L1 and L2 in the interleave boost converter 410.

The input voltage detector A may detect an output terminal voltage of the rectifying unit 405. For instance, the input voltage detector A may include a resistor device, an amplifier, and so on. An input voltage Vc1 to be detected may be a pulse mode discrete signal, and may be inputted to the convertor controller 415.

The output voltage detector B, i.e., the DC terminal voltage detector B, may detect an output terminal voltage of the interleave boost converter 410, particularly, an opposite terminal voltage Vdc of the capacitor C.

The capacitor C is arranged between the inverter 420 and the load 205 for storing an output DC power of the interleave converter thereto. Although the drawing illustrates one device as the smoothing capacitor C, a plurality of devices may be provided for ensuring device stability. Since a DC current is stored in the capacitor C, both terminals of the capacitor C may be referred to as DC terminals or DC link terminals.

If the load includes the inverter 420 and the motor 250, it may be shown that the load 205 is connected to both terminals of the capacitor C in the power converter as shown in the drawing. Accordingly, the DC terminal voltage Vdc may be the same with a load 205 voltage. The output voltage Vdc to be detected may be a pulse mode discrete signal, and may be inputted to the converter controller 415.

The first current detector F1 may detect a current $i_{L1}$ flowing to the first inductor L1 in the first boost converter 410a, and the second current detector F2 may detect a current $i_{L2}$ flowing to the second inductor L2 in the second boost converter 410b. CTS (Current Transformers), shunt resistors and the like may be used as the first and second current detectors F1 and F2. The input AC currents $i_{L1}$, and $i_{L2}$ to be detected may be pulse mode discrete signals, and may be inputted to the converter controller 415.

In addition, the converter controller 415 may have a first converter controller 415a for controlling the first boost converter 410a, and a second converter controller 415b for controlling the second boost converter 410b.

The first converter controller 415a may calculate the load based on the DC terminal voltage Vdc sensed at the output voltage detector B, and the first inductor current $I_{L1}$ detected at the first current detector F1. The first converter controller 415a may control a turn on/turn off timing of the MOSFET switching element S1 in the first boost converter 410a if the calculated load falls in the low load region.

If the calculated load falls in the high load region, the first converter controller 415a may output the calculated load to the second converter controller 415b. Accordingly, the second converter controller 415b may control a turn on/turn off timing of the IGBT switching element S2 in the second boost converter 410b.

If the calculated load falls in the intermediate load region, the first converter controller 415a may control a turn on/turn off timing of the MOSFET switching element S1 in the first boost converter 410a, and may output the calculated load to the second converter controller 415b. Accordingly, the second converter controller 415b may control a turn on/turn off timing of the IGBT switching element S2 in the second boost converter 410b.

In some implementations, the second converter controller 415b may also calculate the load based on the DC terminal voltage Vdc sensed at the output voltage detector B and the second inductor current $I_{L2}$ detected at the second current detector F2. And, if the calculated load falls in the high load region, the second converter controller 415 may control the turn on/turn off timing of the IGBT switching element S2 in the second boost converter 410b.

The inverter 420 has a plurality of inverter switching elements for converting the DC current Vdc smoothed by the turn on/turn off operation of the switching element into a three phase power va, vb, and vc of a predetermined frequency and outputting the same to a three phase synchronous motor 250. In this case, the motor 250 may be a motor in the compressor.

The inverter controller 430 outputs an inverter switching control signal Sic to the inverter 420 for controlling switching operation of the inverter 420. The inverter switching control signal Sic may be a PWM switching control signal, and may be generated and output based on an output current value $i_O$ detected by the output current detector (E in FIG. 9).

Figure 12:
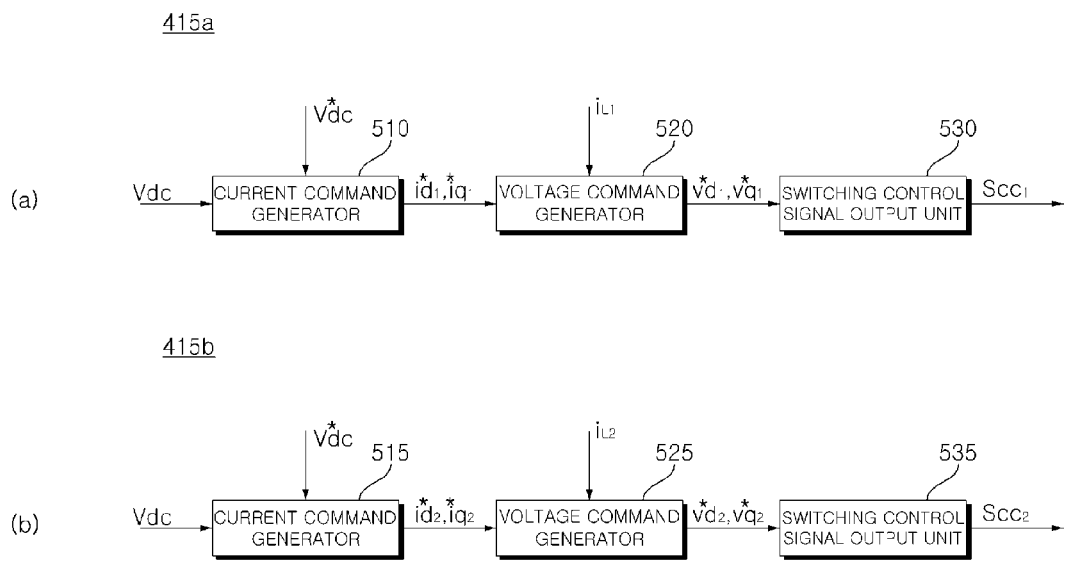
FIGS. 12A and 12B are block diagrams illustrating an example of the converter controllers in FIG. 11.

FIGS. 12A and 12B illustrate an example of the converter controllers in FIG. 11.

FIG. 12A illustrates an example of the first converter controller 415a in FIG. 11. The first converter controller 415a may include a current command generator 510, a voltage command generator 520, and a switching control signal output unit 530.

The current command generator 510 may generate d-axis and q-axis current command values $i^*_{d1}$, $i^*_{q1}$ with a PI controller or the like based on the DC terminal voltage Vdc detected by the output voltage detector B, i.e., the DC terminal voltage detector B, and the DC terminal voltage command value V*dc.

The voltage command generator 520 generates d-axis and q-axis voltage command values $v^*_{d1}$, $v^*_{q1}$ with a PI controller or the like based on the d-axis and q-axis current command values $i^*_{d1}$, $i^*_{q1}$ and the detected first input current $i_{L1}$.

The switching control signal output unit 530 outputs a first converter switching control signal Scc1 to the first boost converter 410a for driving the MOSFET switching element S1 in the first boost converter 410a based on the d-axis and q-axis voltage command values $v^*_{d1}$, $v^*_{q1}$.

The first converter controller 415a outputs the first converter switching control signal Scc1 to the first boost converter 410a for driving the first switching element S1 if the calculated load falls in the low load region based on the DC terminal voltage Vdc detected by the DC terminal voltage detector B, and the first input current $i_{L1}$ detected by the first current detector F1.

Next, FIG. 12B illustrates an example of the second converter controller 415b in FIG. 11. The second converter controller 415b may include a current command generator 515, a voltage command generator 525, and a switching control signal output unit 535.

The current command generator 515 may generate d-axis and q-axis current command values $i^*_{d2}$, $i^*_{q2}$ with a PI controller or the like based on the DC terminal voltage Vdc detected by the output voltage detector B, i.e., the DC terminal voltage detector B, and the DC terminal voltage command value V*dc.

The voltage command generator 525 generates d-axis and q-axis voltage command values $v^*_{d2}$, $v^*_{q2}$ with a PI controller or the like based on the d-axis and q-axis current command values $i^*_{d2}$, $i^*_{q2}$ and the detected second input current $i_{L2}$.

The switching control signal output unit 535 outputs a second converter switching control signal Scc2 to the second boost converter 410b for driving the IGBT switching element S2 in the second boost converter 410b based on the d-axis and q-axis voltage command values $v^*_{d2}$, $v^*_{q2}$.

If the calculated load falls in the high load region, the second converter controller 415b outputs the second converter switching control signal Scc2 to the second boost converter 410b for driving the IGBT switching element S21 based on the DC terminal voltage Vdc detected by the DC terminal voltage detector B, and the second input current $i_{L2}$ detected by the second current detector F2.

Figure 13:
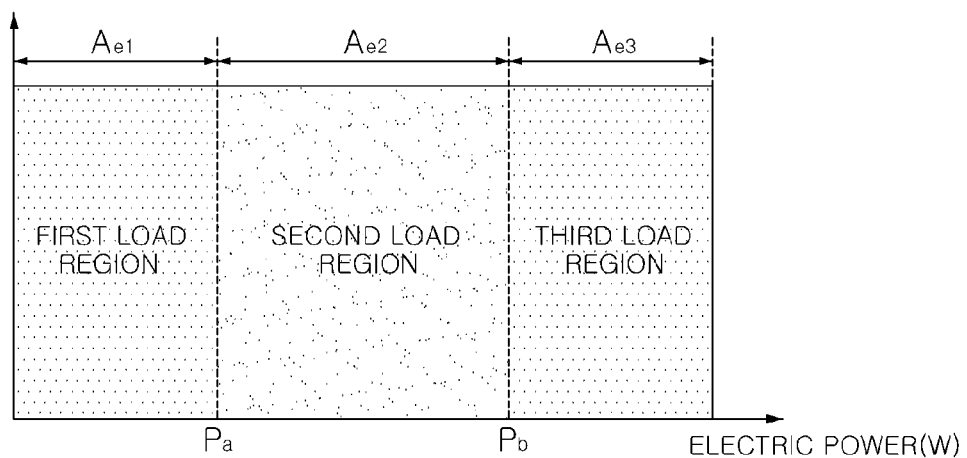
FIG. 13 is a graph illustrating example load regions of a power converter.

FIG. 13 illustrates example load regions of a power converter.

The first converter controller 415a or the second converter controller 415b may calculate the load on both terminals of the capacitor based on the DC terminal voltage Vdc detected by the DC terminal voltage detector B and the first and second input currents $i_{L1}$ and $i_{L2}$ detected by the first and second current detectors F1 and F2. In this case, the load may be electric power.

The first converter controller 415a or the second converter controller 415b may calculate that the load is a low load if the calculated load is lower than a first electric power level Pa, a high load if the calculated load is higher than a second electric power level Pb, and an intermediate load if the calculated load falls between the first electric power level Pa and the second electric power level Pb.

Accordingly, the load may be divided into a low load region Ae1, an intermediate load region Ae2, and a high load region Ae3. In this case, the first electric power level Pa and the second electric power level Pb may be stored in a memory in the power converter 200.

In some examples, the first electric power level Pa and the second electric power level Pb may be variable with an operation condition, and the like. In these examples, if a highest load used for a predetermined time period is below a predetermined value, the first electric power level Pa and the second electric power level Pb may be lowered.

Figure 14A:
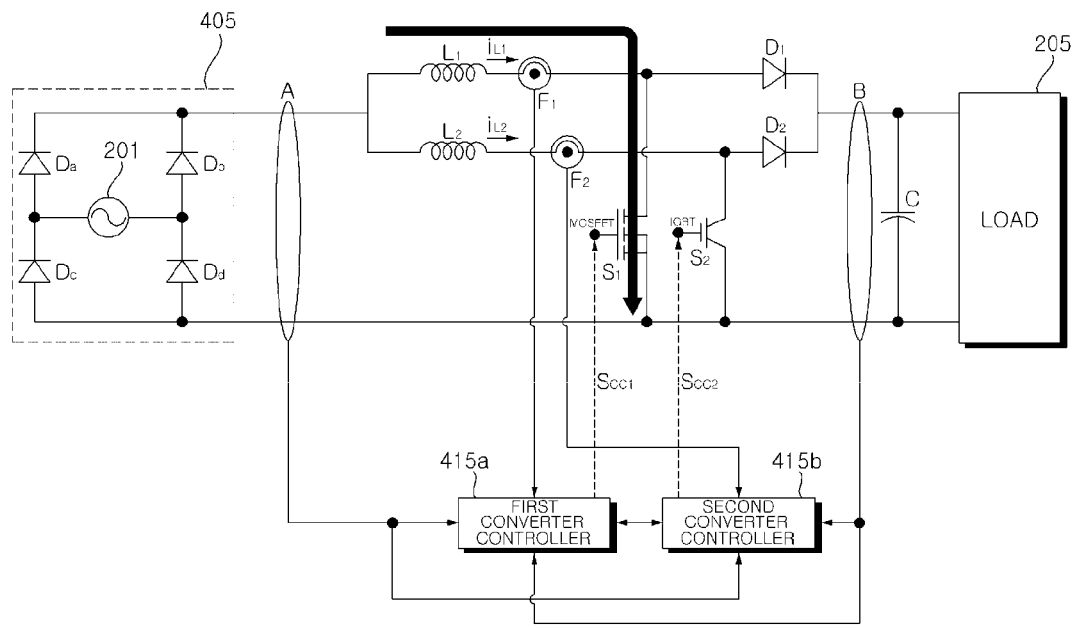
FIGS. 14A to 14C are circuit diagrams illustrating example operation of the power converter in FIG. 11.
Figure 14B:
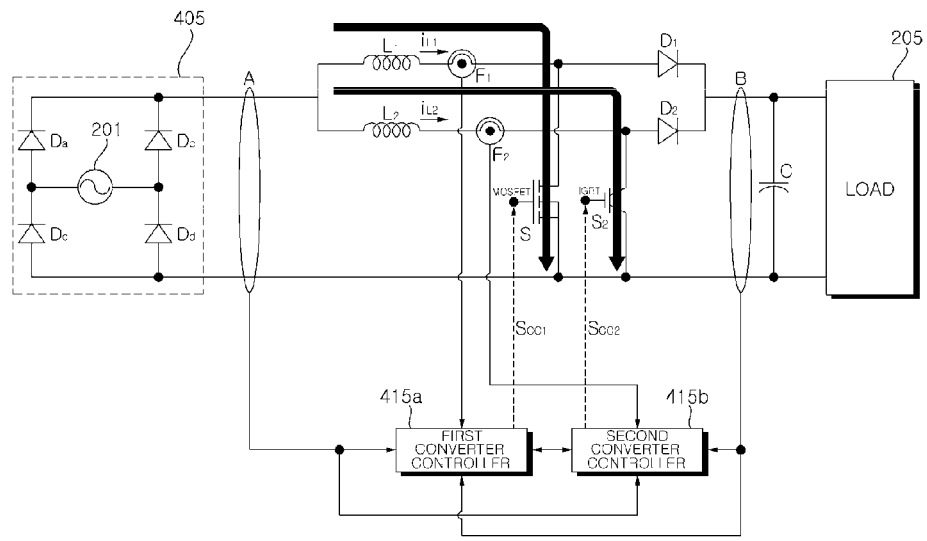
Figure 14C:
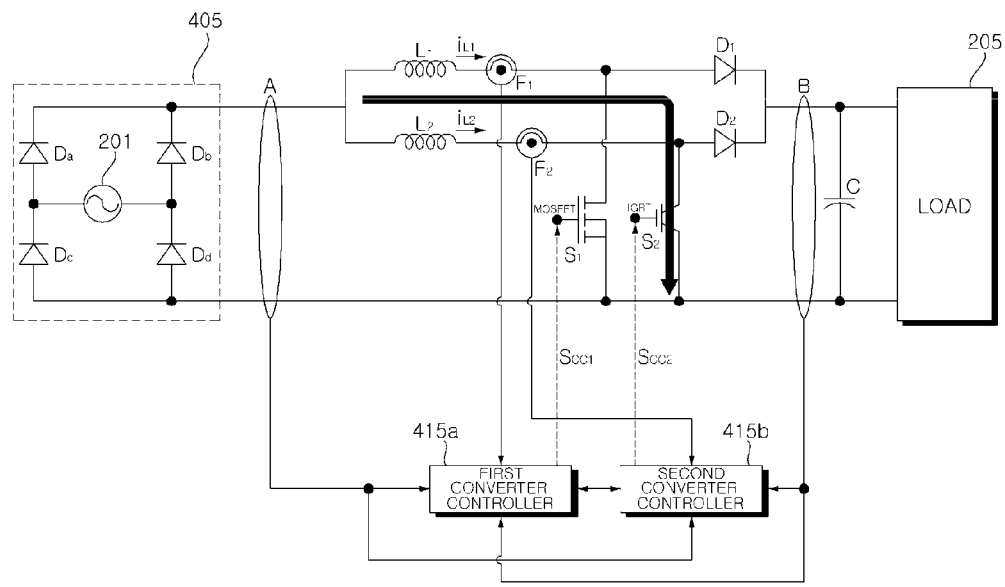

FIGS. 14A to 14C illustrate example operation of the power converter in FIG. 11.

FIG. 14A illustrates example operation of only the first boost converter 410a in the low load region.

If the calculated load is lower than the first electric power level Pa, the first converter controller 415a or the second converter controller 415b calculates that the load is the low load, and controls only the first boost converter 410a to operate.

The MOSFET switching element S1 in the first boost converter 410a is turned on by the first converter switching control signal Scc1 from the first converter controller 415a. Accordingly, current is accumulated at the first inductor L1 for outputting energy accumulated in the first inductor L1 to the capacitor C when the MOSFET switching element S1 is turned off.

Thus, by putting only the MOSFET switching element S1 having a low rated voltage into operation in the low load, the operation efficiency may be improved.

Next, FIG. 14B illustrates example operation of the first boost converter 410a and the second boost converter 410b in the intermediate load region.

If the calculated load falls between the first electric power level Pa and the second electric power level Pb, the first converter controller 415a or the second converter controller 415b calculates that the load is the intermediate load and controls the first boost converter 410a and the second boost converter 410b to perform interleaved operation.

The MOSFET switching element S1 in the first boost converter 410a is turned on in response to the first converter switching control signal Scc1 from the first converter controller 415a. In this case, the IGBT switching element S2 in the second boost converter 410b may be turned off.

Next, when the MOSFET switching element S1 is turned off, the IGBT switching element S2 in the second boost converter 410b is turned on in response to the second converter switching control signal Scc2 from the second converter controller 415b.

Thus, by controlling the first boost converter 410a and the second boost converter 410b to perform interleaved operation in the intermediate load, the input current ripple and noise may be reduced.

FIG. 14C illustrates example operation of only the second boost converter 410b in the high load region.

If the calculated load is higher than the second electric power level Pb, the first converter controller 415a or the second converter controller 415b calculates that the load is the high load, and the first converter controller 415a or the second converter controller 415b controls only the second boost converter 410b to operate.

The IGBT switching element S2 in the second boost converter 410b is turned on by the second converter switching control signal Scc2 from the second converter controller 415b. Accordingly, current is accumulated at the second inductor L2 for outputting energy accumulated in the second inductor L2 to the capacitor C when the IGBT switching element S2 is turned off.

Thus, by putting the IGBT switching element S2 having a high rated voltage into operation in the high load, stable operation may be possible in the high load.

Efficient operation of the power converter may be possible in a variety of loads by operating the power converter using different types of switching elements for respective loads. For instance, efficient drive of the compressor and the like having a large load variation may be possible.

Figure 15A:
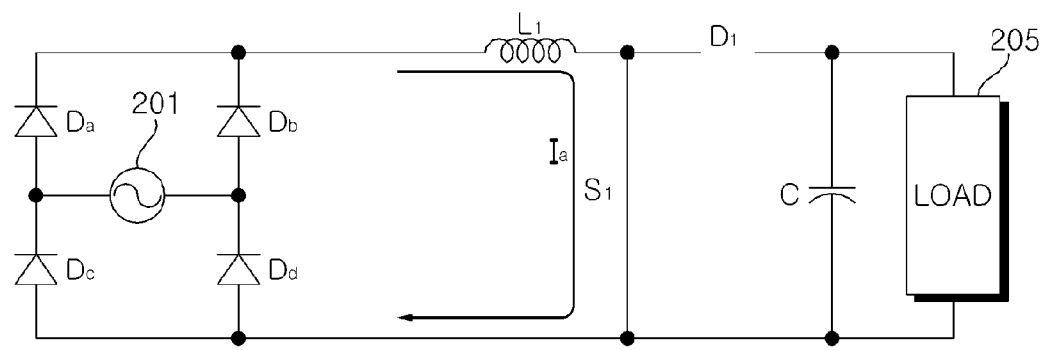
FIGS. 15A and 15B are circuit diagrams for describing example operation of the first converter in FIG. 11.
Figure 15B:
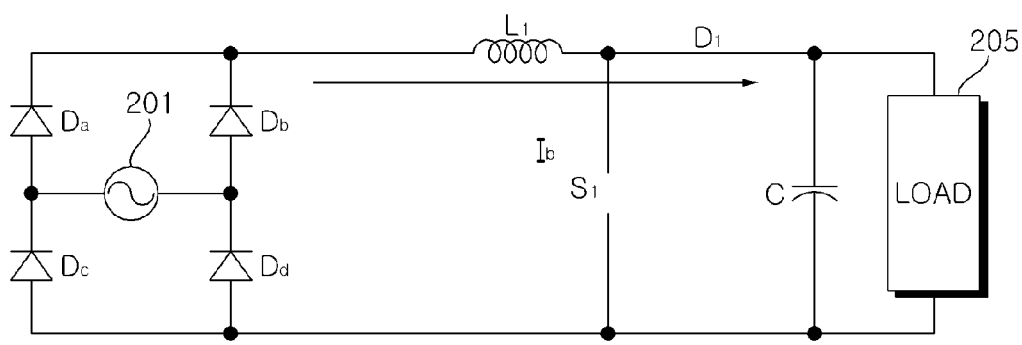

FIGS. 15A and 15B describe example operation of the first converter in FIG. 11.

FIGS. 15A and 15B illustrate the first boost converter 410a operated in a boost mode.

FIG. 15A illustrates current Ia flowing to a closed loop that includes the first inductor L1 and the first boost switching element S1 if the first boost switching element S1 in the first boost converter 410a is turned on. Accordingly, energy is accumulated at the first inductor L1 based on the current Ia. In this case, the first diode D1 is not conductive.

FIG. 15B illustrates the first diode D1 becoming conductive if the first boost switching element S1 in the first boost converter 410a is turned off to cause current Ib to flow through the first inductor L1 and the first diode D1. In FIG. 15A, the current Ib may be a sum of the energy accumulated at the first inductor L1 and the current based on the input AC power source 201.

That is, the first boost switching element S1 in the first boost converter 410a is turned on/off, i.e., pulse width modulated.

Since operation of the second converter is identical to operation illustrated in FIGS. 15A and 15B, detailed description will be referenced, rather than repeated.

Configurations and methods of the examples of the power converter and the air conditioner having the same described herein are applicable, not limited thereto, but the examples may be selectively combined entirely or partly to construct various modifications and variations.

As has been described, the power converter and the air conditioner having the same may have certain advantages.

For instance, the power converter and the air conditioner having the same may include an interleave converter in which the converter controller changes a number of operating converters in the interleave converter based on a load level of both terminals of the capacitor, which may enhance operation efficiency, not only at the low load region, but also at the high load region. Also, active variation of the output voltage of the interleave converter with variation of the load level of both terminals of the capacitor which are output terminals of the interleave converter may enhance operation efficiency throughout an entire load region, thereby enabling efficient driving of a compressor or the like having a large variation in load.

In some implementations, controlling operation of only the first converter in the interleave converter if the load level of both terminals of the capacitor is lower the first level may enable enhanced operation efficiency by removing the switching loss caused by the second converter, and may lower the DC power, which may enlarge a width of the DC terminal voltage at both terminals of the capacitor.

In addition, by controlling operation of the first converter and the second converter in the interleave converter if the load level of both terminals of the capacitor is higher than the first level, stable operation may be made in the high load region.

And, the interleaved operation of the first converter and the second converter may reduce the input current ripple and the noise.

Efficient operation of the power converter may be possible in a variety of loads by changing a number of operating converters with loads by using the interleave converter.

In some examples, the power converter and the air conditioner having the same includes the interleave converter in which the first converter includes a first switching element of a first type and the second converter includes a second switching element of a second type having a rated voltage higher than the first type. In these examples, the switching elements may be matched to a variety of loads.

By operating the first switching element having a low rated voltage in the low load, the operation efficiency may be improved, and by operating the second switching element having a high rated voltage in the high load, stable operation may be possible in the high load region.

And, the interleaved operation of the first converter and the second converter in the intermediate load may reduce the input current ripple and the nose.

The method for operating the power converter and an air conditioner may be implemented as code that can be written to a processor-readable recording medium included in the air conditioner and can thus be read by a processor. The processor-readable recording medium may be any type of recording device in which data can be stored in a processor-readable manner.

Although examples have been described with reference to the illustrated drawings, it will be apparent to those skilled in the art that the present disclosure is not intended to be limited to the above-described examples and drawings, and various changes or modifications may be made therein without departing from the scope and the technical sprit of the present disclosure and appended claims.

What is claimed is:

1. A power converter comprising:
   a rectifying unit configured to rectify an input AC current;
   an interleave converter (i) that has a plurality of converters that includes a first converter and a second converter and (ii) that is configured to convert rectified output from the rectifying unit to DC power and output the converted DC power;
   a capacitor connected to an output terminal of the interleave converter;
   a converter controller configured to control the interleave converter by calculating a load level of both terminals of the capacitor and changing a number of operating converters in the plurality of converters of the interleave converter based on the calculated load level of both terminals of the capacitor;
   an inverter connected between the capacitor and a motor and configured to convert the converted DC power to AC power and output the AC power to the motor;
   an output current detector configured to detect an output current flowing through the motor; and
   an inverter controller configured to control the inverter based on the detected output current,
   wherein the first converter in the interleave converter includes a first switching element of a first type and the second converter in the interleave converter includes a second switching element of a second type having a rated voltage higher than the first type,
   wherein the converter controller is configured to:
      operate only the first converter based on a calculation that the load level of both terminals of the capacitor is lower than a first electric power level to cause the power converter to operate according to a first load vs. operation efficiency curve,
      operate the first converter and the second converter based on a calculation that the load level of both terminals of the capacitor is higher than the first electric power level to cause the power converter to operate according to a second load vs. operation efficiency curve, and
      reduce the first electric power level based on a maximum load level of both terminals of the capacitor being less than a predetermined load level, and
   wherein the inverter controller further comprises:
      a speed calculator to calculate a speed of the rotor based on the detected output current;
      a current command generator to generate a current command value based on the speed of the rotor and a target speed;
      a voltage command generator to calculate a voltage command value based on the current command value; and
      a switching control signal output unit to output a switching control signal for driving the inverter based on the voltage command value.

2. The power converter of claim 1, wherein the converter controller is configured to control operation of the first switching element of the first converter based on a calculation that the load level of both terminals of the capacitor is lower than the first electric power level, and control operation of the first switching element of the first converter and a second switching element of the second converter based on a calculation that the load level of both terminals of the capacitor is higher than the first electric power level.

3. The power converter of claim 2, wherein the converter controller is configured to control the first and second switching elements of the first and second converters to perform interleaved operation based on a calculation that the load level of both terminals of the capacitor is higher than the first electric power level.

4. The power converter of claim 1:
   wherein the first converter in the interleave converter includes:
      a first inductor connected to the rectifying unit,
      a first diode connected to the output terminal of the interleave converter, and
      the first switching element connected in parallel between the first inductor and the first diode, and
   wherein the second converter in the interleave converter includes:
      a second inductor connected to the rectifying unit,
      a second diode connected to the output terminal of the interleave converter, and the second switching element connected in parallel between the second inductor and the second diode.

5. The power converter of claim 4, further comprising a voltage detector configured to detect a voltage at both terminals of the capacitor, and
wherein the converter controller is configured to calculate a load connected to the power converter based on at least one of current flowing to the first inductor in the first converter or current flowing to the second inductor in the second converter and the detected voltage at both terminals of the capacitor, and control operation of the interleave converter based on the calculated load.

6. The power converter of claim 1, further comprising a voltage detector configured to detect a voltage at both terminals of the capacitor, and
wherein the converter controller is configured to control operation of the interleave converter based on the detected voltage at both terminals of the capacitor.

7. The power converter of claim 1,
wherein the converter controller includes a first converter controller that is configured to control the first converter, and a second converter controller that is configured to control the second converter,
wherein the first converter controller is configured to calculate the load level of both terminals of the capacitor,
wherein the first converter controller is configured to control a turn on timing or a turn off timing of the first switching element in the first converter based on the calculated load level being lower than the first electric power level, and
wherein the first converter controller is configured to output the calculated load level to the second converter controller based on the calculated load level being higher than the first electric power level, and the second converter controller is configured to control a turn on timing or a turn off timing of the second switching element in the second converter.

8. A power converter comprising:
a rectifying unit configured to rectify an input AC current;
an interleave converter that has a plurality of converters and that is configured to convert rectified output from the rectifying unit to DC power and output the converted DC power, the plurality of converters including a first converter that includes a first switching element of a first type and a second converter that includes a second switching element of a second type having a rated voltage higher than the first type;
a converter controller configured to control the interleave converter;
an inverter connected between the capacitor and a motor and configured to convert the converted DC power output from the interleave converter to AC power and output the AC power to the motor;
an output current detector configured to detect an output current flowing through the motor; and
an inverter controller configured to control the inverter based on the detected output current,
wherein the converter controller is configured to:
operate only the first converter based on a calculation that a load level of an output terminal of the interleave converter is lower than a first electric power level to cause the power converter to operate according to a first load vs. operation efficiency curve,
operate the first converter and the second converter based on a calculation that the load level of the output terminal of the interleave converter is higher than the first electric power level to cause the power converter to operate according to a second load vs. operation efficiency curve, and
reduce the first electric power level based on a maximum load level of the output terminal of the interleave convertor being less than a predetermined load level, and
wherein the inverter controller further comprises:
a speed calculator to calculate a speed of the rotor based on the detected output current;
a current command generator to generate a current command value based on the speed of the rotor and a target speed;
a voltage command generator to calculate a voltage command value based on the current command value; and
a switching control signal output unit to output a switching control signal for driving the inverter based on the voltage command value.

9. The power converter of claim 8, further comprising a capacitor connected to the output terminal of the interleave converter,
wherein the converter controller is configured to control operation of the first switching element of the first converter based on a calculation that a load level of both terminals of the capacitor is lower than the first electric power level, and control operation of the second switching element of the second converter based on a calculation that the load level of both terminals of the capacitor is higher than a second electric power level which is higher than the first electric power level.

10. The power converter of claim 9, wherein the converter controller is configured to control operation of the first and second switching elements of the first and second converters based on a calculation that the load level of both terminals of the capacitor falls between the first electric power level and the second electric power level.

11. The power converter of claim 8, wherein the converter controller includes:
a first converter controller configured to control the first converter, and
a second converter controller configured to control the second converter.

12. The power converter of claim 8,
wherein the converter controller includes a first converter controller that is configured to control the first converter, and a second converter controller that is configured to control the second converter,
wherein the first converter controller is configured to calculate the load level of output terminal of the interleave converter,
wherein the first converter controller is configured to control a turn on timing or a turn off timing of the first switching element in the first converter based on the calculated load level being lower than the first electric power level, and
wherein the first converter controller is configured to output the calculated load level to the second converter controller based on the calculated load level being higher than the first electric power level, and the second converter controller is configured to control a turn on timing or a turn off timing of the second switching element in the second converter.

13. An air conditioner comprising:
a compressor; and
a power converter configured to supply power to a motor in the compressor, wherein the power converter includes:
a rectifying unit configured to rectify an input AC current,
an interleave converter (i) that has a plurality of converters that includes a first converter and a second converter and (ii) that is configured to convert rectified output from the rectifying unit to DC power and output the converted DC power,
a capacitor connected to an output terminal of the interleave converter,
a converter controller configured to control the interleave converter by calculating a load level of both terminals of the capacitor and changing a number of operating converters in the plurality of converters of the interleave converter based on the calculated load level of both terminals of the capacitor,
an inverter connected between the capacitor and the motor and configured to convert the converted DC power to AC power and output the AC power to the motor,
an output current detector configured to detect an output current flowing through the motor, and
an inverter controller configured to control the inverter based on the detected output current,
wherein the first converter in the interleave converter includes a first switching element of a first type and a second converter in the interleave converter includes a second switching element of a second type having a rated voltage higher than the first type,
wherein the converter controller is configured to:
operate only the first converter based on a calculation that the load level of both terminals of the capacitor is lower than a first electric power level to cause the power converter to operate according to a first load vs. operation efficiency curve,
operate the first converter and the second converter based on a calculation that the load level of both terminals of the capacitor is higher than the first electric power level to cause the power converter to operate according to a second load vs. operation efficiency curve, and
reduce the first electric power level based on a maximum load level of both terminals of the capacitor being less than a predetermined load level, and
wherein the inverter controller further comprises:
a speed calculator to calculate a speed of the rotor based on the detected output current;
a current command generator to generate a current command value based on the speed of the rotor and a target speed;
a voltage command generator to calculate a voltage command value based on the current command value; and
a switching control signal output unit to output a switching control signal for driving the inverter based on the voltage command value.

14. The air conditioner as claimed in claim 13:
wherein the converter controller is configured to control operation of the first switching element of the first converter based on a calculation that the load level of both terminals of the capacitor is lower than a first electric power level, and control operation of the first switching element of the first converter and the second switching element of the second converter based on a calculation that the load level of both terminals of the capacitor is higher than the first electric power level.

15. The air conditioner as claimed in claim 13:
wherein the first converter in the interleave converter includes:
a first inductor connected to the rectifying unit,
a first diode connected to the output terminal of the interleave converter, and
the first switching element connected in parallel between the first inductor and the first diode, and
wherein the second converter in the interleave converter includes:
a second inductor connected to the rectifying unit,
a second diode connected to the output terminal of the interleave converter, and
the second switching element connected in parallel between the second inductor and the second diode.

16. The air conditioner as claimed in claim 15, further comprising a voltage detector configured to detect a voltage of both terminals of the capacitor,
wherein the converter controller is configured to calculate a load connected to the power converter based on at least one of current flowing to the first inductor in the first converter or current flowing to the second inductor in the second converter and the detected voltage at both terminals of the capacitor, and control operation of the interleave converter based on the calculated load.

17. An air conditioner comprising:
a compressor; and
a power converter configured to supply power to a motor in the compressor,
wherein the power converter includes:
a rectifying unit configured to rectify an input AC current,
an interleave converter that has a plurality of converters and that is configured to convert rectified output from the rectifying unit to DC power and output the converted DC power, the plurality of converters including a first converter that includes a first switching element of a first type and a second converter that includes a second switching element of a second type having a rated voltage higher than the first type,
a converter controller configured to control the interleave converter,
an inverter connected between the capacitor and the motor and configured to convert the converted DC power output from the interleave converter to AC power and output the AC power to the motor,
an output current detector configured to detect an output current flowing through the motor, and
an inverter controller configured to control the inverter based on the detected output current,
wherein the converter controller is configured to:
operate only the first converter based on a calculation that load level of output terminal of the interleave converter is lower than a first electric power level to cause the power converter to operate according to a first load vs. operation efficiency curve, and
operate the first converter and the second converter based on a calculation that the load level of the output terminal of the interleave converter is higher than the first electric power level to cause the power converter to operate according to a second load vs. operation efficiency curve, and
reduce the first electric power level based on a maximum load level of the output terminal of the interleave converter being less than a predetermined load level, and wherein the inverter controller further comprises:
- a speed calculator to calculate a speed of the rotor based on the detected output current;
- a current command generator to generate a current command value based on the speed of the rotor and a target speed;
- a voltage command generator to calculate a voltage command value based on the current command value; and
- a switching control signal output unit to output a switching control signal for driving the inverter based on the voltage command value.

* * * * *